July 25, 1967  O. D. LARRISON  3,333,183
PHOTOCELL ACTUATED SIGNAL ATTENUATING DEVICE
Filed Feb. 1, 1965  2 Sheets-Sheet 1

INVENTOR
O. D. LARRISON
BY Young & Quigg
ATTORNEYS

INVENTOR
O. D. LARRISON
BY Young & Quigg
ATTORNEYS

3,333,183
PHOTOCELL ACTUATED SIGNAL ATTENUATING DEVICE

Owen D. Larrison, St. Peters, Mo., assignor to Phillips Petroleum Company, a corporation of Delaware
Filed Feb. 1, 1965, Ser. No. 429,431
2 Claims. (Cl. 323—64)

This invention relates to the selective attenuating of electrical signals.

Various types of chromatographic analyzers have been developed in recent years to detect the constituents of sample mixtures. A predetermined volume of the material to be analyzed is introduced into a column which contains a packing material. A carrier gas is then introduced into the column so as to drive the constituents of the sample through the packing material. Since the individual constituents of the sample have different affinities for the packing material, the column effluent contains these constituents in sequence. The column effluent is directed through a detector which provides an output signal representative of changes in composition of the effluent. For example, the detector can comprise a temperature sensitive resistance element which is connected in a bridge network. Since the sample constituents have different thermal conductivities, the output signal from the bridge will change in response to the presence of these different constituents.

The output signal from a detector of this type often fluctuates through a broad range during the analysis of a sample mixture. If the output signal from the bridge is applied directly to a recorder, the scale of the recorder must be adjusted in order to accommodate the maximum value of the output signal. However, this makes it difficult to observe accurately those signals of smaller amplitudes. In order to overcome this difficulty, attenuating methods have been developed so that the output signal from the bridge network is selectively attenuated by varying amounts during the analysis in order that signals of approximately equal amplitudes are recorded at all times. The attenuating method must be programmed so that the signals are attenuated at the proper times and by known amounts in order that the final records can be interpreted correctly. If a manual alternating method is used, there is always the chance that the operator will make errors. Such a method is also time consuming. Many of the automatic attenuators now available require complex switching mechanism which tends to produce irregular chart recordings at the points where the attenuation level is changed.

This invention provides a simple attenuating device which can be employed to advantage in a chromatographic analyzer. A plurality of resistors are connected in series relationship between the input and output terminals of the attenuator. A plurality of switching means are connected between the resistors so that the total amount of resistance connected in the network can be varied. The switching means are actuated by relays which are controlled by photocells. The photocells are positioned adjacent one another on the first side of a rotatable disk. A light source is mounted on the other side of the disk so that the photocells are energized selectively, depending upon the opacity of those sections of the disk immediately adjacent the respective photocells. Opaque segments are selectively formed on the disk so that the photocells are illuminated in a predetermined fashion in accordance with rotation of the disk. This in turn controls the resistance connected in the attenuating circuit.

Accordingly, it is an object of this invention to provide apparatus for selectively attenuating electrical signals by preselected amounts.

Another object is to provide an improved detector for use in chromatographic analyzers.

Other objects, advantages and features of the invention should become apparent from the following detailed description which is taken in conjunction with the accompanying drawing in which.

Figure 1:
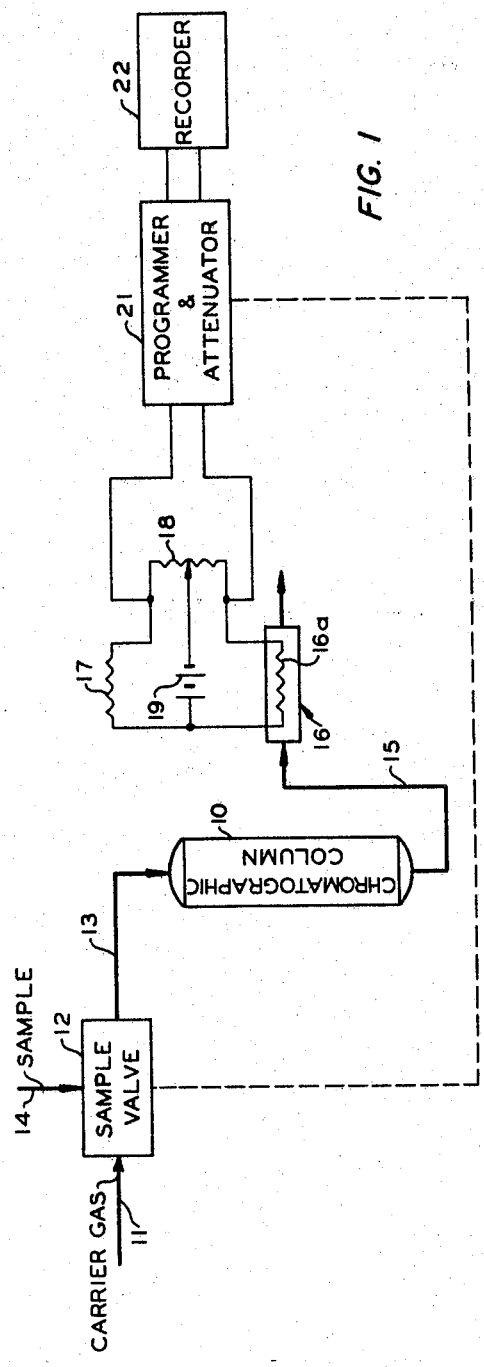
FIGURE 1 is a schematic representation of a chromatographic analyzer having the signal attenuator of this invention incorporated therein.

Referring now to the drawing in detail and to FIGURE 1 in particular, there is shown a conventional chromatographic column 10. A carrier gas is introduced into the system through a conduit 11 which communicates with a sample valve 12. A fluid sample to be analyzed is introduced into valve 12 by means of a conduit 14. The effluent from valve 12 is introduced into column 10 through a conduit 13. The effluent from column 10 is removed through a conduit 15 which communicates with a detector cell 16. The carrier gas initially flows through column 10 to flush the column. Valve 12 is then actuated so that a preselected volume of sample material is introduced into the carrier gas stream. The sample is thus carried into the column, which thereafter results in the individual constituents appearing sequentially in the column effluent. Various types of sample valves are known which can be employed for the purpose of introducing preselected volumes of sample into the carrier gas.

Detector cell 16 contains a temperature sensitive electrical resistance element 16a which is disposed so that the gas from column 10 flows past the element. Element 16a forms one arm of a bridge network. A resistor 17 and the two arms of a potentiometer 18 form the remaining arms of the bridge. A voltage source 19 is connected between the contactor of potentiometer 18 and the junction between resistors 16a and 17. The two end terminals of potentiometer 18 are connected to the input of the programmer and attenuator 21 of this invention. The output signal from the attenuator is applied to a recorder 22. Any change in thermal conductivity of the column effluent, due to a change in composition of the effluent, changes the unbalance of the bridge to vary the amplitude of the signal applied to the attenuator. If desired, a stream of the carrier gas can be directed past element 17 at all times in order to compensate for any variations in temperature or composition of the carrier gas.

Figure 2:
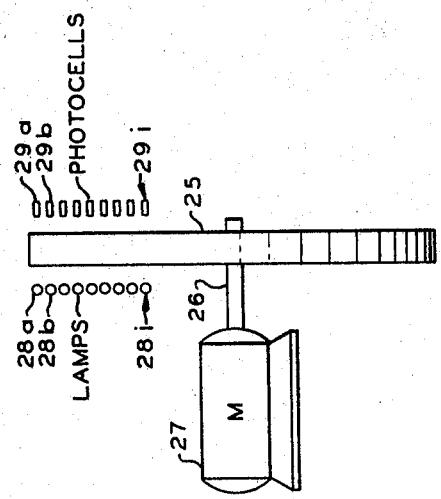
FIGURE 2 illustrates the rotatable disk, light source and photocells employed in the signal attenuator.

The attenuator is controlled by a rotatable disk 25, see FIGURE 2, which is connected to the drive shaft 26 of a motor 27. A plurality of lamps 28a to 28i are positioned adjacent one another on one side of disk 25. A plurality of photocells 29a to 29i are disposed on the opposite side of disk 25 so as to be illuminated by the respective lamps. The optics of the system are such that each lamp can illuminate only the corresponding photocell. This can readily be accomplished by the use of suitable shielding devices, not shown. It should be evident that while individual lamps are shown adjacent each of the photocells, a single light source with appropriate apertures and shields can be employed for the same purpose.

Figure 3:
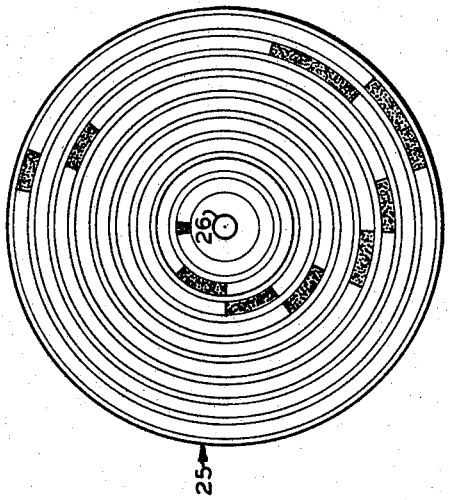
FIGURE 3 illustrates a typical configuration of the disk employed in the signal attenuator.

As illustrated in FIGURE 3, the face of disk 25 is provided with a plurality of rings, each of which is adjacent a respective one of the photocells. The disk is formed of a transparent material. However, segments of the individual rings can readily be marked so as to make the segments opaque. If disk 25 is formed of glass or a transparent plastic material, the individual segments can readily be placed on the disk by ink, crayon or pencil. This permits the segments to be erased or extended, depending on the particular attenuation program that is desired.

Figure 4:
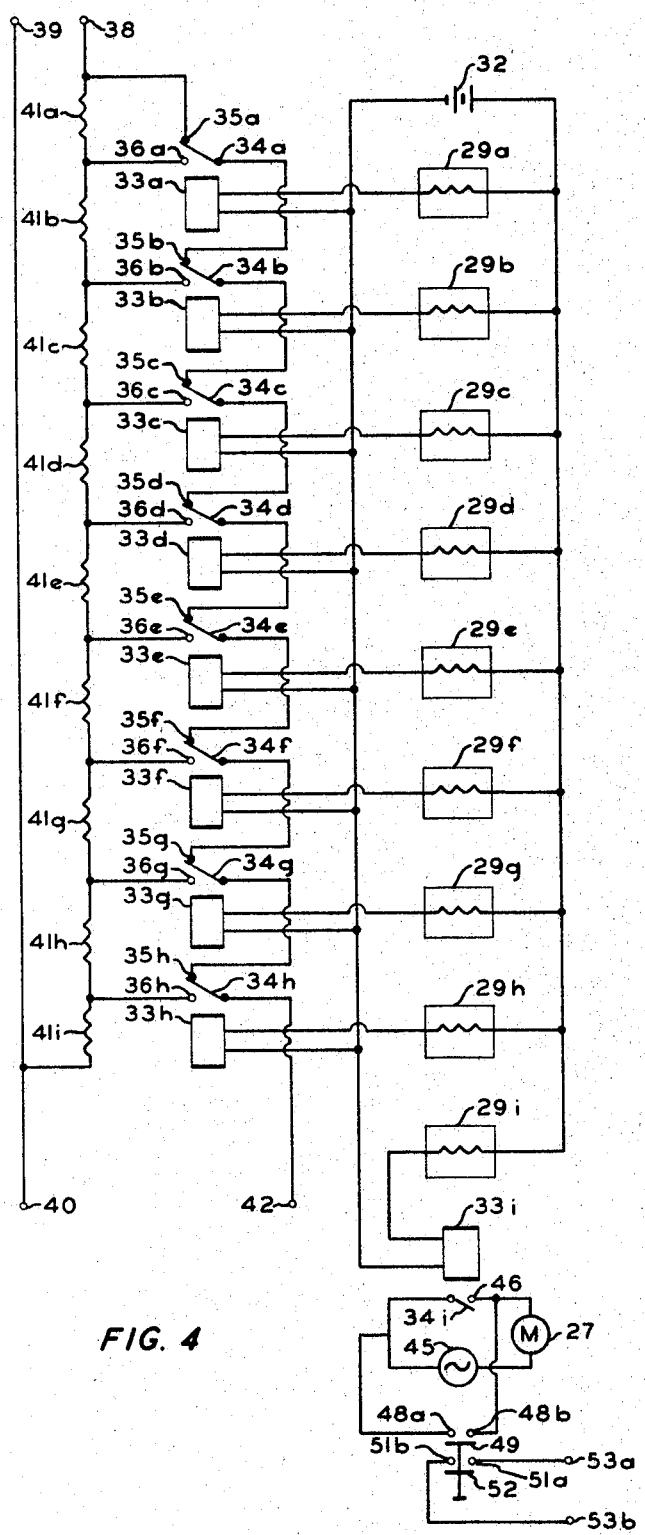
FIGURE 4 is a schematic circuit drawing of the electrical components of the signal attenuator of this invention.

The electrical components of the attenuator circuit are illustrated schematically in FIGURE 4. This circuit is provided with input terminals 38 and 39 which represent the input of the programmer and attenuator 21 of FIGURE 1. The circuit of FIGURE 4 is provided with output terminals 40 and 42, which terminals are connected to recorder 22 of FIGURE 1. A plurality of resistors 41a to 41i are connected in series between terminal 38 and terminal 40. A plurality of relay coils 33a to 33h, which actuate respective switches 34a to 34h, are provided in the circuit of FIGURE 4. In the absence of current being supplied to the respective relay coils, switches 34a to 34h engage respective terminals 35a to 35h. When current is supplied to the respective relay coils, switches 34a to 34h are moved into engagement with respective terminals 36a to 36h. Input terminal 38 is connected to terminal 35a. Terminal 34a is connected to terminal 35b. Terminal 36a is connected to the junction between resistors 41a and 41b. The remaining switches are connected in a similar fashion, as illustrated. Switch 34h is connected to output terminal 42.

First end terminals of photocells 29a to 29h are connected to one terminal of a voltage source 32. The second terminals of photocells 29a to 29h are connected to the second terminal of voltage source 32 through respective relay coils 33a to 33h. The photocells are photo-conductive devices which have relatively low resistances when the photocells are illuminated. When the illumination from one of the lamps is blocked by an opaque segment on disk 25, the resistance of the corresponding photocell is increased so that current flow through the associated relay coil is terminated to cause the relay to be deactuated. As can be seen from an inspection of FIGURE 4, all of the resistors 41a to 41i are effectively removed from the circuit in the absence of any of the relay coils being energized. If relay coil 33a is energized, for example, resistor 41a is connected in the circuit between the input and output terminals. If relay coil 33d is energized, resistors 41a to 41d are connected in the circuit. If relay coil 33h is energized, resistors 41a to 41h are connected in the circuit. Thus, the amount of resistance which is connected in the attenuating circuit, and the resulting attenuation of the signal from the bridge, is regulated in response to the particular photocell which is illuminated. It should be evident that a wide range of attenuation factors are possible, depending on the values of the individual resistors 41a to 41i. In one specific embodiment of this invention, resistors having the following values (in ohms) are employed:

| Resistor: | Value |
| --- | --- |
| 41a | 6400 |
| 41b | 3200 |
| 41c | 1600 |
| 41d | 800 |
| 41e | 400 |
| 41f | 200 |
| 41g | 100 |
| 41h | 50 |
| 41i | 50 |

Disk 25 of FIGURE 3 is constructed so that segments of the individual rings are opaque in accordance with the desired attenuation to be provided at different times of the analysis cycle. This is determined initially by performing an analysis of a typical sample in the absence of any attenuation to determine the relative amplitudes of the signals representing the various components of the sample. The desired attenuation is then set by selectively making segments of disk 25 opaque. It should be evident that a particular disk configuration can be used only for analyses of samples of the same general composition. However, such analyses are often required repeatedly in many industrial and laboratory operations. A different disk can be prepared for each different type of sample. If desired, an amplifier can be employed before the attenuator to increase the amplitudes of all of the signals by a preselected amount prior to the selective attenuation.

As illustrated in FIGURE 3, the innermost ring is provided with a single small opaque segment. This segment controls the amount of light which reaches photocell 29i. As illustrated in FIGURE 4, photocell 29i is connected in circuit with a relay coil 33i. When relay coil 33i is energized, a switch 34i is moved into engagement with terminal 46. This connects a current source 45 in circuit with motor 27. Current can also be supplied to motor 27 from source 45 when a switch 49 is actuated to connect terminals 48a and 48b. A second switch 52 is connected to switch 41 so as to connect terminals 51a and 51b. These latter terminals are connected to respective output terminals 53a and 53b. At the beginning of the analysis cycle, switches 49 and 52 are closed momentarily by the operator. This supplies current to motor 27 to start rotation of disk 25. When disk 25 is moved to a location such that light reaches photocell 29i, relay coil 33i is energized to close switch 34i. This retains current source 45 in circuit with motor 27 until the end of the analysis cycle. At the end of the analysis cycle, the opaque segment moves in front of photocell 29i to deenergize relay coil 33i, thereby opening switch 34i. This terminates rotation of motor 27.

Switch 52 is is provided to control the operation of sample valve 12. Terminals 53a and 53b are connected to a control mechanism, not shown, so that closure of switch 52 actuates a circuit to actuate valve 12. For example, an initial pulse can initiate a cycle of operation of the sample valve to first trap a selected volume of sample in a conduit and then displace this volume into column 10 with the carrier gas. Suitable mechanism for this purpose is known in the art.

While this invention has been described in conjunction with a presently preferred embodiment, it obviously is not limited thereto.

What is claimed is:

1. Signal attenuation apparatus comprising:
   first and second input terminals;
   first and second output terminals, means connecting said first input terminal directly and continuously to said first output terminal;
   a plurality of resistance elements connected continuously in series between said second input terminal and said first output terminal;
   a plurality of switching means connected together between said second input terminal to said second output terminal so as to connect said second input terminal to said second output terminal when all of said switching means are in first positions;
   means connecting the junctions between said resistance elements to respective ones of said switching means so that each of said junctions is selectively connected to said second output terminal when the switching means associated therewith is in a second position and the remainder of said switching means are in said first positions;
   a plurality of photocells mounted adjacent one another;
   a source of light spaced from said photocells;
   a disk which is partially transparent and partially opaque;
   a motor connected to said disk to rotate said disk between said source of light and said photocells so that said photocells selectively receive radiation from said source of light;
   a plurality of relay coils to actuate respective ones of said switching means; and
   means connecting said photocells to respective ones of said relay coils so as to actuate the relay coils and associated switching means in response to radiation received by said photocells, whereby rotation of said disk between said source of light and said photocells controls the amount of resistance connected between said second input terminal and said second output terminal as a function of the light transmission properties of said disk.

2. The apparatus of claim 1, further comprising a voltage source, a first switch to connect said voltage source to said motor when said first switch is closed, an additional photocell positioned adjacent said plurality of photocells so as to receive radiation from said source of light when a transparent portion of said disk is between said additional photocell and said source of light, an additional relay coil to close said first switch when energized, means connecting said additional photocell to said additional relay coil to control same, said disk having light transmission properties adjacent said additional photocell such that said first switch is closed shortly after the start of rotation of the disk from a first position and remains closed until said disk reaches said first position, and a second switch connected in parallel with said first switch, said second switch being manually operable to permit said motor to be energized from said voltage source at times when said first switch remains open.

References Cited
UNITED STATES PATENTS

| | | |
|---|---|---|
| 2,755,020 | 7/1956 | Belcher. |
| 2,966,671 | 12/1960 | Abbott et al. |
| 3,023,605 | 3/1962 | Burk _____ 73—23.1 |
| 3,069,894 | 12/1962 | Claudy _____ 73—23.1 |
| 3,117,266 | 1/1964 | Raymond _____ 318—480 X |

JOHN F. COUCH, *Primary Examiner.*

A. D. PELLINEN, *Assistant Examiner.*